United States Patent [19]

Inabata

[11] Patent Number: 4,939,038
[45] Date of Patent: Jul. 3, 1990

[54] LIGHT METALLIC COMPOSITE MATERIAL AND METHOD FOR PRODUCING THEREOF

[75] Inventor: Tadao Inabata, Tokyo, Japan

[73] Assignee: Inabata Techno Loop Corporation, Tokyo, Japan

[21] Appl. No.: 127,536

[22] Filed: Nov. 30, 1987

Related U.S. Application Data

[63] Continuation-in-part of Ser. No. 5,856, Jan. 21, 1987, abandoned.

[30] Foreign Application Priority Data

Jan. 22, 1986 [JP] Japan .................................. 61-9830
Apr. 15, 1986 [JP] Japan ................................. 61-84891
Apr. 15, 1986 [JP] Japan ................................. 61-84893

[51] Int. Cl.$^5$ .................... B32B 17/02; C22C 29/12
[52] U.S. Cl. .................................... 428/402; 428/403;
428/406; 428/545; 428/547; 428/548; 428/551;
428/553; 428/558; 428/556; 428/565; 75/230;
75/232; 75/233; 75/234; 75/235
[58] Field of Search ............... 428/402, 403, 406, 564,
428/544–548, 551, 558, 553–556, 565; 75/234,
235, 230, 232, 233

[56] References Cited

U.S. PATENT DOCUMENTS

| | | | |
|---|---|---|---|
| 3,137,927 | 7/1960 | Huegez et al. | 75/235 |
| 3,781,170 | 12/1973 | Nakao et al. | 75/234 |
| 3,963,449 | 6/1976 | Seki et al. | 75/234 |
| 4,423,097 | 12/1989 | Mons et al. | 428/325 |
| 4,565,744 | 1/1986 | Walter et al. | 428/570 |
| 4,605,594 | 8/1986 | Owens et al. | 428/375 |
| 4,623,388 | 11/1986 | Jaktar et al. | 75/325 |

*Primary Examiner*—George F. Lesmes
*Assistant Examiner*—Christopher Brown
*Attorney, Agent, or Firm*—Lowe, Price, LeBlanc, Becker & Shur

[57] ABSTRACT

A light metallic composite material containing therein fine granular additives dispersed in a matrix of a light metallic material, which composite material has a light weight, high mechanical strength, and excellent characteristics such as high damping ability. The additives each have a density less than that of the matrix and heat resistance enough to withstand a heating temperature at which they are composited with the matrix. Preferably, the additives are each formed with a coating which increases mechanical strength and provides an electromagnetic characteristic different from that of the matrix. Preferably, the composite material is produced by heating a mixture of matrix powders and additives up to a temperature where only part of the mixture including no microspheres is softened but the mixture is adequately composited, an amount of additives being equal to 10% to 70% by volume of the matrix, and by forming the composited mixture into a desired shape and solidifying same.

10 Claims, 3 Drawing Sheets

4,939,038

LIGHT METALLIC COMPOSITE MATERIAL AND METHOD FOR PRODUCING THEREOF

This application is a continuation-in-part of application Ser. No. 005,856, filed Jan. 21, 1987, now abandoned.

BACKGROUND OF THE INVENTION

The present invention relates to a light metallic material, and more particularly to a light metallic composite material containing therein fine granular additives (hereinafter referred to as microspheres), which are small in size and weight and high in heat resistance, and having a light weight, increased mechanical strength and other improved material characteristics such as high damping ability, and to a method for producing such type of composite material in a stabilized manner.

Recently, a number of ligh metals and light composite materials have been developed, which have improved material characteristics. However, it is still difficult to make materials of these kinds lighter in weight and at the same time higher in strength because of incompatibility between these factors, and by the use of conventional arts of selecting a specific combination of metallic constituents each having a considerably large density. Conventional composite materials such as ones containing carbon fibers are also insufficient in this respect.

SUMMARY OF THE INVENTION

An object of the present invention is to provide a light metallic composite material which is light in which and high in mechanical strength and has other improved material characteristics such as high damping ability.

A further object of the present invention is to provide a light metallic composite material having improved mechanical strength and a nature as a multi-function material by the use of microspheres each having an outer surface formed with a coating.

A still further object of the present invention is to provide a method of producing in a stabilized manner a light metallic composite material of a type including microspheres uniformly dispersed in a matrix, and having a light weight, increased strength and other improved characteristics such as high damping ability.

According to one aspect of the present invention, a light metallic composite material comprises a matrix of a light metallic material and microspheres, i.e., fine granular additives dispersed in the matrix. These microspheres each have a density smaller than that of the matrix and a heat resistance sufficient to withstand a heating temperature to which the microsphere are subjected upon being composited with the matrix. Preferably, the microsphere is formed into a hollow shape, with its outer surface formed with a coating.

According to another aspect of the present invention, a method of producing a light metallic composite material comprises the steps of: adding microspheres having a density smaller than that of a matrix into the matrix of a light metallic material which is preferably in the form of powder, an amount of the microspheres to be added being preferably equal to 10% to 70% by volume of the matrix; heating the mixture up to a predetermined temperature which is preferably set to a value at which part of the mixture is softened and the remaining part thereof including the microspheres is kept unmelted, so that the microspheres are composited with the matrix; and forming the thus composited mixture into a desired shape and then solidifying same.

DETAILED DESCRIPTION

With reference to the accompanying drawings, embodiments of the present invention will be described.

Figure 1:
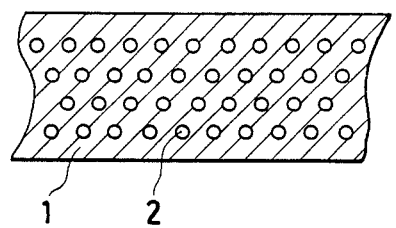
FIG. 1 is a fragmentary schematic sectional view showing a light metallic composite material according to a first embodiment of the present invention.

FIG. 1 shows a light metallic composite material according to a first embodiment of the present invention, which is composed of a matrix 1 into which a number of fine granular additives, i.e., microspheres 2, which are small in size and weight and high in heat resistance, are mixed and dispersed. The matrix 1 is composed of an element which is selected from a group consisting of: light materials including aluminum, magnesium, zinc, copper, brass, bronze; and light metal alloys including an aluminum alloy. In this embodiment, an aluminum base extruded material A-6063 (Japanese Industrial Standard) is employed as the matrix 1. On the other hand, the micropsheres employed in the present invention are prepared in substantially the same manner as conventional microspheres or microcellular fillers which have been recently developed as filler to be mixed in plastics and high molecular compounds and employed essentially for reinforcing materials of the kind having low mechanical strengths and low melting points. For instance, the microspheres are prepared by a melting method wherein pressurized air is ejected to a molten raw material which flows from a heating furnace so that the material is formed into fine particles each of which contains therein air bubbles, or by a sintering method wherein a volatile component of granular raw material is vaporized to be contained in respective molten or softened granules during the sintering process. However, as distinct from conventional ones, the microsphere 2 is composed of at least one element which is selected from a group consisting of: heat-resistant glasses having a high melting point, which include borosilicate glass, silica glass, silica-alumina glass, and sintered metals; and ceramic materials including silica, alumina and zirconia, so that the microsphere 2 has its softening point and melting point higher than those of conventional ones, and exhibits chemical stability to constituents of the matrix such as Al, Mg, and Si. In the present embodiment, the microsphere composed of borosilicate glass is employed. Further, in order to harmonize various characteristics of the resultant composite material such as lightness, strength, and damping ability, the microsphere is prepared in a manner having a diameter less than 300 microns and formed into a hollow sphere filled with a gas such as air.

In manufacturing the composite material, first, the micropsheres 2 are added into a molten metal of the alminum base extruded material A-6063 as the matrix 1, and amount of the microspheres to be added being equal to 10 to 70% by volume of the matrix, 30%, for instance. Thereafter, the molten metal is stirred sufficiently to be mixed and composited with the microspheres. Thereafter, the mixture is cooled to obtain an aluminum-microsphere composite billet. As mentioned above, the microspheres 2 are added into the molten matrix metal, and are thus subjected to heating. However, at this time, the microspheres 2 withstand the heating temperature and are hardly broken in the mixing/compositing process, to be composited with and dispersed uniformly in the matrix. If desired, the composited billet is then heated and subjected to various forming processes such as rolling and extrustion, and heat treatments such as quenching and tempering, to obtain a final product.

Although the microsphere itself cannot withstand unidirectional external force and is thus liable to be broken, it becomes mechanically stabilized against the external forces exerted along various directions once it is mixed in the matrix 1 because of its outer spherical shape which allows the external forces to be balanced or cancelled. Further, the gas filled in the interior of the microsphere 2 expands and contracts in volume with thermal expansion and contraction of the matrix 1, to provide the microsphere with thermal stability. As a result, the microsphere is kept stabilized in the manufacturing process of the composite billet and subsequent forming processes, to be hardly broken or extinguished in the matrix 1.

Next, a composite material according to a second embodiment of the present invention will be explained.

The composite material is composed of a matrix 1 and microspheres 2 dispersed therein, as in the first embodiment. As compared with the composite material of the first embodiment where the microspheres 2 are added into a molten metal of the matrix 1, the composite material of the second embodiment is differently produced in that the microspheres 2 are added into matrix powders. This is quite effective to avoid ununiformity in the distribution of the microspheres 2 in the matrix 1 which can occur due to the presence of a considerably large difference in density therebetween.

In the following, a method of producing the composite material mentioned above will be explained.

At first, the powders of the matrix 1 and the microspheres 2 are prepared, respectively. In the present embodiment, employed are the matrix powders of an aluminum-5% magnesium each having a predetermined particle size, and microspheres of borosilicate glass having a melting point falling within a range of 1,000° C. to 1,200° C. and a diameter less than 300 microns, and formed into a hollow spherical shape. An amount of the microspheres 2 to be added into the matrix 1 is determined so as to fall within a range of 10% to 70% by volume of the matrix 1, 20%, for instance, these limits corresponding to the preferred smallest value above the lightness requirement of the composite material is fulfilled, and the largest value below which the strength requirement is fulfilled, respectively.

Next, the matrix 1 and the microspheres 2 are stirred to be mixed adequately into a uniform mixture, and the mixture is heated to a fluidized state in which part of the mixture is softened whereas the remaining part thereof is kept in its solid state and no microsphere is softened and melted. That is, the mixture is heated up to a predetermined temperature (620° C.–630° C. in the present embodiment) and maintained at this temperature for a required period of time so that a ratio of the liquid or near liquid state to the solid state is adjusted to a predetermined value, 50% by volume, for instance, in other words, the mixture as a whole becomes fluidized. The reasons for limiting the heating temperature within the specific range in heating and fluidizing the mixture so that the liquid/solid ration of the heated mixture reaches the predetermined value are as follows: If all of the matrix 1 is in its liquid state, the matrix powders and the microspheres 2 are separated from each other because of the considerable density a difference therebetween, which makes it impossible to achieve a desired uniform distribution of the microspheres in the matrix, whereas an excessively small ratio of the liquid part to the solid part makes it difficult for the two elements of the mixture to be sufficiently composited with each other.

On the other hand, in case of heating the mixture up to the above-mentioned predetermined temperature so as to achieve the desired liquid/solid ratio, a desired fluidized state of the mixture is established, wherein the entire microspheres 2 are kept in a solid state whereas 30% to 70% of the matrix are fluidized so that the heated mixture is partly softened and has an appropriate viscosity. As a result, the matrix powders and the micropheres are composited with each otehr in a positive manner, and are not separated from each other in spite of the presence of the considerable difference in their densities. Thus, the uniform distribution of the microspheres 2 in the matrix having been achieved in the preceding mixing process is unchanged. In addition, the heated mixture is provided with preferable fluidity.

Next, the heated mixture having fluidity is formed into a desired shape with ease and then cooled to obtain an aluminum-microsphere composite billet. Thereafter, if desired, the bullet is subjected to various forming processes such as rolling, extrusion, and stamping after being heated, and to subsequent heat treatment such as quenching, and tempering, so as to obtain a final product.

The microspheres 2 dispersed in the matrix 1 as mentioned above are stable even in the various forming processes for the same reasons as those mentioned in connecton with the first embodiment, and withstand a pressure greater than 100 Kg/cm$^2$, for instance.

Incidentally, the heated mixture having fluidity may be formed into the composite bullet directly by the use of press dies.

Figure 2:
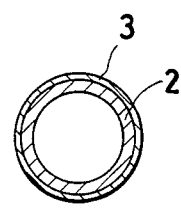
FIG. 2 is an enlarged schematic sectional view showing a microsphere employed for a composited material according to a third embodiment of the present invention.

A composite material according to a third embodiment of the present invention is different from those of the above-mentioned two embodiments in that each of the microspheres 2 is subjected to a surface treatment. More specifically, as shown in FIG. 2, it is formed at its outer surface with a coating, so as to improve mechanical strength of the microsphere 2 itself and hence the resultant composite material, and preferably, to provide the composite material with natures of multi-function material. A constituent of the coating is selected from a group consisting of aluminum, zinc, copper, silver, iron, ferrite, etc., an aluminum coating 3 being formed in the present embodiment.

In manufacturing the composite material, firstly, the coating 3 is formed on the microsphere 2. For instance, after cleaning, the microspheres 2 of borosilicate glass are floated and dispersed in an evaporation chamber wherein an aluminum metal is evaporated and deposited on the outer surfaces of the respective microspheres to form an aluminum coating 3 thereon. Thereafter, the coated micropsheres 2 in an amount of 20% by volume of the matrix are added to matrix powders of an aluminum - 5% magnesium alloy having appropriate particle sizes, and the thus obtained mixture is stirred to achieve a uniform distribution of the microsphere in the matrix powders. Then, as in the second embodiment, the mixture is heated up to a predetermined temperature to be composited and fluidized, and is formed into a composite bullet, and is further formed into a final product through various processes. In the present embodiment, the fluidized mixture may be also formed into the final product directly by the use of press dies.

In this manner, the microsphere 2 is formed with the coating 3 which improves mechanical strength, and is thus more stable than those of the first and second embodiments in various forming process for obtaining the composite bullet. Further, in the case of selecting the constituent of the coating 3 having physical properties which are the same as or similar to those of the matrix 1, it is possible to improve material intimacy between the matrix component and the microsphere component, and hence the formability of the heated mixture and the strength of the resultant composite material.

In the following there are shown, by way of example, results of measurement of two characteristic properties, i.e., Vickers hardness numbers and densities of ten samples of each of first to third composite materials A, B and C which relate to the above-mentioned third embodiment of the present invention.

The composite materials A, B and C were produced from aluminum matrix powders and micropsheres which consist of 65% Si - 35% Al and a balance of inevitable impurities and have average particle sizes of 75 microns, 100 microns and 75 microns, and coated with Al, Cu and Zn, respectively.

Vickers hardness numbers of ten samples of the first composite material A were 24.4317, 24.7903, 25.8182, 24.5652, 28.1303, 24.6549, 28.5738, 25.7222, 22.9911 and 24.7903, and the average value thereof was 25.4468. Vickers hardness numbers of the second material B were 19.9341, 20.7421, 17.2365, 21.3084, 22.2024, 24.1678, 21.4172, 22.8701, 18.8377 and 17.9964, the average value being 20.6713. Further, Vickers hardness numbers of the third material C were 25.6266, 25.0185, 22.9911, 22.5129, 22.2024, 24.3432, 23.8225, 23.4012, 25.6266 and 24.5206, with the average value of 24.0066. In the meantime, Vickers hardness number of a sample obtained by solidifying molten aluminum and then forging same was 22.3399.

Furthermore, the average density of ten samples of the materials A, B and C were 1.7958 $g/cm^3$, 1.6961 $g/cm^3$ and 1.8711 $g/cm^3$, respectively, while aluminum has a density of 2.6989 $g/cm^3$. Since respective specific gravities of Al. Cu and Zn coated microspheres were 0.85, 0.80-0.85 and 0.80-0.90, a voluminal ratio of microsphere in the composite materials were caluculated as 46.4%, 51.5% and 42.5%, respectively.

Figure 3:
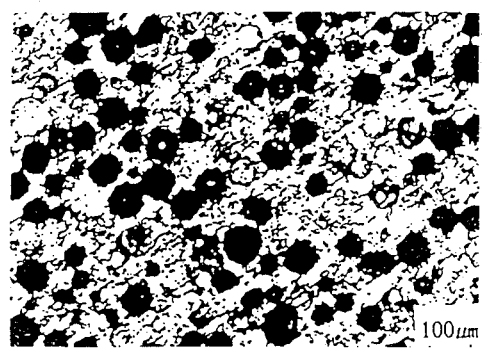
FIG. 3 is a photograph of a composite material according to the present invention, which contains microspheres coated with aluminum.
Figure 4:
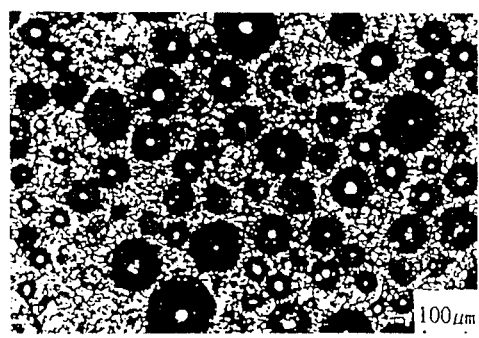
FIG. 4 is a photograph of a composite material containing copper-coated microspheres.

In FIGS. 3 and 4, which are photographs of polished surfaces of the first and second materials A and B, black circular portions represent microspheres, whereas the other portions represent matrix or matrix component flowed into microspheres broken the during manufacturing process of the composite material.

Figure 5:
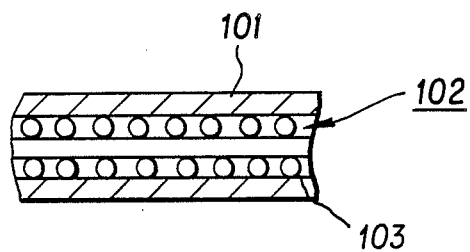
FIG. 5 is a fragmentary schematic sectional view showing a filler used to produce a composite material according to a fourth embodiment of the present invention.
Figure 6:
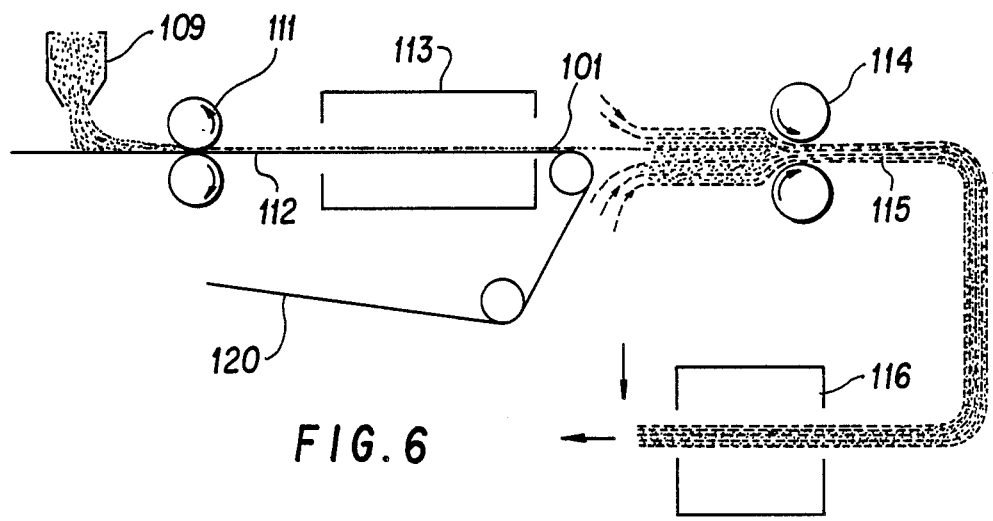
FIG. 6 is a schematic view showing a production process of the filler.

FIG. 5 shows a filler which is advantageously used to produce a composite material according to a fourth embodiment of the present invention. The filler, which is to be filled in and composited with various kinds of matrix, cooperates with the matrix to form the composite material. The filler consists of mats 101 and microsphere layers 102, these elements being alternately stacked on each other. A number of microspheres 103 as fine granular additives are dispersed on and fixed to the mat 101, respectively.

In manufacturing the filler, first the microspheres 103 are prepared. In this embodiment, hollow silica-alumina microspheres are used, which are composed of 58-65 wt % silica, 28-38 wt % alumina and less than 4 wt % iron oxide. For instance, the microspheres have a wall thickness 0.1 times their diameter, a melting point of 1200° C., a bulk density of 408 $Kg/m^3$, a pressure-resistance strength of 5000 psi, and a hardness of 5 (Moh).

Then, the mat 101 is prepared. Fibers are prepared, which are short in length and composed of a material selected from a group consisting of heat-resistant glasses having a high melting point; ceramic materials; and metallic materials. Preferably, short fibers such as carbon fibers, alumina fibers or whiskers are used. In this embodiment, alumina fibers composed of 72-95% alumina and 5-28% silica are employed for reinforcing purposes, and alumina fibers composed of 72% alumina and 28% silica are employed for heat insulating purposes. Typically, these fibers have a melting point of 1600° C., a true specific gravity of 3.0-3.5 $g/cm^3$ and a fiber diameter of 3 microns.

The short fibers are uniformly supplied from a hopper 109 on a belt conveyor 110, and firmly affixed to each other by means of rollers 111 to be formed into a sheet 112. The thus obtained sheet 112 is passed through a sintering furnace 113 to thereby obtain the mat 101. Alternatively, the mat 101 may be obtained by forming long fibers composed of one of the abovementioned constituents into a net. In this case the long fiber net is sintered, where required.

Next, the microspheres 103 are uniformly dispersed on at least one surface of each of a required number of the mats 101 which have been respectively prepared in a manner mentioned above. Thereafter, these mats 101 are passed through rollers 114, with the mats 101 stacked on each other, so that the mats 101 are firmly affixed to each other to obtain a stacked body of the microspheres and the mats, i.e., a composite mat 115. Further, the composite mat 115 is passed through a sintering furnace 116 so that the composite mat 115 is sintered to thereby firmly weld respective microspheres 103 to associated mats 101 In this embodiment, the sintering temperature varies within a range of 900-1100° C. Finally, the thus sintered composite mat 115 is cut into a required length by the use of a cutter (not shown) to obtain a filler.

In the following, an explanation will be given as to a method of manufacturing a composite material which uses the filler thus obtained.

At first, the filler is disposed within a molding die (not shown). Then, a molten matrix (not shown) is poured into the die. Preferably, the matrix is composed of an element selected from a group consisting of light metallic materials including aluminum, magnesium, zinc, copper, brass and bronze; light metal alloys including an aluminum alloy; and synthetic resins. In order to improve various characteristics of the composite material, the supplied amount of the molten matrix is set so that the ratio of the molten matrix to the microspheres varies from 10:1 to 10:7 by volume. When the molten matrix is poured in, the microspheres are heated. The microspheres, which withstand the heating temperature and are never destroyed, are positively composited with the matrix. Further, since the microspheres 103 are affixed to the mats 101 beforehand in a uniform distribution, and, the mats 101, which withstand the molten matrix temperature, positively hold the microspheres 103, these microspheres 103 are never separated upon pouring of the molten matrix, and are hence distributed uniformly in the matrix, which is different in density from the microspheres 103. To enhance the composite process, pressure may be applied to the molten matrix and/or the die. Thereafter, a composite bullet is obtained through a cooling process. Further, the bullet is heated and subjected to various forming processes such as rolling and extrusion, and heat treatments such as quenching and tempering, if desired, to obtain a final product or the composite material.

In manufacturing the composite material, matrix powders may be employed in place of the molten matrix. In this case, the matrix powders are supplied into a molding die in which the filler is disposed. Preferably, the supplied amount of the matrix is set so that the volume ratio of the matrix to the microspheres varies from 10:1, which corresponds to a limit for satisfying a lightening requirement of the composite material, to 10:7 corresponding to another limit for a strengthening requirement of same. Then, the matrix and the filler are heated up to a temperature at which at least part of the matrix is fluidized so that these two elements are composited with each other. Thereafter, the resultant material is cooled to obtain the above-mentioned bullet.

Although, in the preferred embodiment, the filler comprises the mats and the microsphere layers alternately stacked on each other, only a single microsphere layer may be formed to a single mat. The filler of this type is suitable to obtain a thin composite material.

The present invention is not limited to the first to fourth embodiments, and various modifications may be made.

For instance, although the microspheres of hollow type are employed in the embodiments, microspheres of solid type may be employed. In this case, advantages similar to those of the hollow microspheres can be attained. Namely, the resultant composite material is descreased in weight due to a density difference between the matrix and the microsphere, and is reinforced by the microspheres, and is provided with a damping function due to a rigidity difference between the two components. Further, the microsphere may be formed into a clustered shape other than a spherical shape.

In the first embodiment, a composite bullet is produced by means of an ordinary casting process followed by a forming process to obtain a final product. Alternatively, die casting process may be used.

When it is difficult to obtain a matrix material in the form of powder, and at the same time a considerable density difference is found between the matrix and the microspheres which results in difficulty in uniform distribution of the microspheres in the molten matrix, a composite bullet can be produced in the following manner. Namely, microspheres are added to a thin layer of molten matrix to be composited therewith, and the resultant composite layer is cooled to a temperature below which no fluidity of the layer is found. Thereafter, operations of pouring new molten matrix to form a thin molten layer on the preceding thin composite layer and of adding the microspheres thereinto are repetitively carried out to obtain a laminated composite bullet having a considerably uniform distribution of the microspheres in the matrix. To improve the mechanical properties of a final product manufactured by the use of the bullet of this kind, required heat treatment of the product may be performed.

Ceramic powders and sintered metal powders may be employed as matrix powders. In this case, pressing and sintering should be performed in such pressure and temperature conditions that no fracture of microsphere occurs, and further preset values of pressure and temperature may be set stepwise, where required, so as to ensure stability of the matrix. In such a process, hot or cold isostatic pressing is useful.

Further, in the case of producing a composite material for a product having a strict finish requirement or the order of several microns such as a tape-guide cylinder provided with a video head for use in a video tape recorder, a centrifugal forming process can be applied. According to this process, no microspheres, which could produce a rough finish, are distributed on the surface of the composite material or the cylinder, and the finish requirment is fulfilled.

Furthermore, a coating 3 formed on the outer surface of the microsphere 2 may consist of a material having one or more electromagnetic characteristics, which are different from those of the matrix, to thereby provide the composite material, as a whole, with a nature of a multi-function material. For instance, a magnetic coating and an electrically conductive coating may be formed on the microspheres for use with a non-magnetic matrix and a non-conductive matrix, respectively. A coating of various types may also be formed on the microspheres included in the fourth embodiment set forth above.

The composite material and the method of producting thereof according to the present invention can produce the following advantages:
(i) Since the microsphere 2, in particular, the hollow microsphere filled with a gas such as air, is light in weight, a reduction in weight can be achieved at a great extent in proportion to the mixing ratio of the microspheres.
(ii) Since the microspheres 2 dispersed in the matrix 1 are stable against an exteranl force and a change in temperature, improved tensile strength, ductility, heat resistance, etc. can be provided, and deterioration in mechanical properties can be also avoided.
(iii) Since vibration and noise are damped down due to a rigidity difference between the microsphere 2 and the matrix 1, in particular, due to the presence of a gas filled in the hollow microsphere, high damping ability of the resultant composite material can be provided.
(iv) Since the microspheres have a heat-insulating function, the resultant composite material has a high heat-insulation ability.
(v) As compared with ordinary light metals and light metal alloys, manufacturing cost can be reduced by a great extent.
(vi) Since the composite material has various improved characteristics, it is applicable to various applications, such as building materials, structural materials for vehicle and aircraft, and parts of electric, electrical or mechanical equipment. In particular, the composite material is suitable for a structural material of a platen of printers. A metal product of a type floatable in water can be also produced.

(vii) Increased mechanical strength and a nature of multi-function material can be provided by the use of the microspheres formed with a desired coating.

(viii) Since a mixture of microspheres and matrix can be provided with suitable fluidity, with uniform distribution of microspheres in the matrix kept unchanged, the composite material can be produced with ease in a stabilized manner.

(ix) Since the granular additives having heat-resistance resistance are dispersed on the mat formed of fibers having heat-resistance, the filler can be heated up to a temperature at which the filler is composited with the matrix, and the resultant composite material is high in strength. Further, since the additives are affixed to the mat beforehand, the additives are uniformly dispersed in the filler and hence in the composite material, to improve the uniformity of the filler and the composite material in their various characteristics.

What is claimed is:

1. A method of producing a uniform, light metallic composite material, comprising the steps of:
   (a) adding and uniformly mixing fine granular additives into matrix powders, said matrix powders being formed of a material selected from the group consisting of light metallic materials selected from the group consisting of aluminum, magnesium, zinc, copper, brass and bronze, and light metal aluminum alloys, said additives consisting of at least one material selected from the group consisting of heat-resistant glasses selected from the group consisting of borosilicate glass, silica glass, silica-alumina glass and silica-alumina-calcium glass; sintered metals; and ceramic materials selected from the group consisting of silica, alumina and zirconia, each of said additives having a density smaller than that of said matrix powder and a diameter less than 300 microns, the amount of said additives added into said matrix powder being in the range of 10% to 70% by volume of said matrix;
   (b) forming the mixture obtained in the step (a) into a desired shape; and
   (c) simultaneously with or succeeding the step (b), heating the mixture up to a predetermined temperature at which 30 to 70% of said matrix powders contained in the mixture are softened and the remainder of the matrix powders and the entire amount of said fine granular additives are not melted, so that said fine granular additives are positively composited with the matrix powders and the uniform distribution of said fine granular additives in said matrix powders is maintained.

2. A method according to claim 1, wherein a coating is formed on a surface of each of said granular additives prior to said step (a).

3. A method according to claim 2, wherein said coating consists of a metal which is materially initimate with said matrix powders.

4. A method according to claim 2, wherein said coating consists of a material which provides an electromagnetic characteristic different from that of said matrix powder.

5. A method of producing a light metallic composite material, comprising the steps of:
   (a) forming a thin layer of a molten matrix, said matrix consisting of a material selected from the group consisting of light metallic materials selected from the group consisting of aluminum, magensium, zinc, copper, brass and bronze, and light metal aluminum alloys;
   (b) adding fine granular additives into said thin layer of said matrix so that said fine granular additives are composited with said matrix, said additives consisting of at least one material selected from the group consisting of heat-resistance glasses selected from the group consisting of borosilicate glass, silica glass, silica-alumina glass and silica-alumina-calcium glass; sintered metals; and ceramic materials selected from the group consisting of silica, alumina and zirconia, each of said additives having a density smaller than that of said matrix and a diameter less than 300 microns, the amount of said additives added into said matrix being in the range of 10 to 70% of said matrix;
   (c) cooling the resulting composite layer obtained in step (b) to a temperature at which the matrix is no longer molten;
   (d) executing said steps (a)-(c) on the resultant solid composite; and
   (e) repeating said steps (a)-(d) a required number of times to obtain a laminated composite layer, and cooling the thus obtained laminated composite layer.

6. A method according to claim 5, wherein a coating is formed on said surface of each of said granular additives prior to said step (a).

7. A method according to claim 5, wherein said coating consists of a metal which is materially intimate with said matrix.

8. A method according to claim 5, wherein said coating consists of a material which provides an electromagnetic characteristic different from that of said matrix.

9. A method of producing a composite material including a matrix and a filler, comprising the steps of:
   (a) forming fibers into at least one mat, each of said fibers having a heat-resistance sufficient to withstand a heating temperature at which the fiber is composited with said matrix;
   (b) uniformly dispersing fine granular additives on at least one surface of said at least one mat obtained in said step (a), each of said additives having a density smaller than that of said matrix and a heat-resistance sufficient to withstand a heating temperature at which the additive is composited with said matrix;
   (c) affixing said additives dispersed on said at least one mat to said at least one mat to form said filler; and
   (d) compositing said filler with said matrix to obtain said composite material, said compositing comprising disposing said filler in a molding die, and then pouring said matrix in its molten state into said die.

10. A method of producing a filler which is adapted to be filled in a matrix, comprising the steps of:
   (a) forming fibers into at least one mat, each of said fibers having a heat-resistance sufficient to withstand a heating temperature at which the fiber is composited with said matrix;
   (b) uniformly dispersing fine granular additives on at least one surface of said at least one mat obtained in said step (a), each of said additives having a density smaller than that of said matrix and a heat-resistance sufficient to withstand a heating temperature at which the additive is composited with said matrix; and
   (c) affixing said additives dispersed on said at least one mat to said at least one mat to form said filler.

* * * * *